(12) United States Patent
Seo et al.

(10) Patent No.: US 8,543,250 B2
(45) Date of Patent: Sep. 24, 2013

(54) ELECTRIC APPLIANCE AND A CONTROL METHOD THEREOF

(75) Inventors: Mun Seok Seo, Seoul (KR); Jin Seong Hwang, Seoul (KR); Dae Geun Seo, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 12/909,451

(22) Filed: Oct. 21, 2010

(65) Prior Publication Data

US 2011/0098869 A1    Apr. 28, 2011

(30) Foreign Application Priority Data

Oct. 26, 2009  (KR) ........................ 10-2009-0101942

(51) Int. Cl.
*G05D 3/12*    (2006.01)
*G06F 17/00*    (2006.01)

(52) U.S. Cl.
USPC .............. 700/296; 700/22; 700/291; 705/412

(58) Field of Classification Search
USPC .................... 700/22, 291, 295, 296; 705/412
See application file for complete search history.

(56) References Cited

U.S. PATENT DOCUMENTS

| | | | |
|---|---|---|---|
| 5,924,486 A | 7/1999 | Ehlers et al. | |
| 6,853,291 B1 | 2/2005 | Aisa | |
| 7,110,832 B2 * | 9/2006 | Ghent | 700/16 |
| 7,561,977 B2 * | 7/2009 | Horst et al. | 702/62 |
| 2008/0114499 A1 * | 5/2008 | Hakim et al. | 700/291 |
| 2009/0088907 A1 | 4/2009 | Lewis et al. | |
| 2009/0240380 A1 | 9/2009 | Shah et al. | |

FOREIGN PATENT DOCUMENTS

JP    2003-178894 A    6/2003

OTHER PUBLICATIONS

B. Saint, "Rural Distribution System Planning Using Smart Grid Technologies," 2009 IEEE Rural Electric Power Conference, Apr. 29, 2009, pp. B3-1-B3-8.
J.A. Momoh et al., "Smart Grid Design for Efficient and Flexible Power Networks Operation and Control," 2009 IEEE/PES Power Systems Conference and Exposition, Mar. 18, 2009, pp. 1-8.

* cited by examiner

*Primary Examiner* — Sean Shechtman
(74) *Attorney, Agent, or Firm* — Birch, Stewart, Kolasch & Birch, LLP

(57) ABSTRACT

An electric appliance and a control method thereof are disclosed. The electric appliance includes a communication device connected with a smart grid net to recognize electric power information including power-rate information for each time period, a sensing device configured to sense a predetermined operation mode and an operation state according to the operation mode, and a control device configured to implement power-saving operation based on the received electric power information and the state information sensed by the sensing device.

18 Claims, 16 Drawing Sheets

ELECTRIC APPLIANCE AND A CONTROL METHOD THEREOF

CROSS REFERENCE TO RELATED APPLICATION

This application claims the benefit of the Patent Korean Application No. 10-2009-0101942, filed on Oct. 26, 2009, which is hereby incorporated by reference as if fully set forth herein.

BACKGROUND OF THE DISCLOSURE

1. Field of the Disclosure

The present invention relates to an electric appliance and a control method thereof, more particularly, to an electric appliance which can reduce power-rate in consideration of power-rate information and an implementation state of an operation mode, with providing users with usage convenience.

2. Discussion of the Related Art

The power required to operate home electric appliances or office electric appliances may be supplied by an electric power station managed by Korea Power Electric Corporation, transmission lines and the order of the distributed wires.

The electric power has a characteristic of center generation, not distributed generation, and it has a radial-type structure. Also, the electric power has another characteristic of a one-way-supplier-oriented, not consumer-oriented.

Technology of power generation is analog or electromechanical and it has to be restored manually when an accident occurs. Necessary equipment also has to be restored manually.

Power-rate information is not achievable real-time but limitedly achievable via Korea Power Exchange. A power-rate system is substantially fixed price system. Because of that, inducement such as incentives for consumers which uses rate-change cannot be used.

To solve these problems and to improve energy efficiency, research and development for Smart Grid has been under progress recently.

Smart Grid is a next-generation electric power system represented by convergence of modernized electric power technology and information communicational technology, and management thereof.

As mentioned above, a current electricity network is center-based and center-integrated network controlled by a supplier vertically. In contrast, Smart Grid is less-integrated by the supplier and horizontal, collaborative and distributive network which enables the consumer and supplier to communicate with each other.

According to Smart Grid, all of electric appliances, power storage devices and distributed electric power are connected with a network to enable the consumer and the supplier to communicate with each other. Because of that, Smart Grid is often called as 'Energy Internet'.

In the meanwhile, to embody such Smart Grid on an electricity consumer part such as a home or building, a network connected with a single and plurality of electric appliances is required to implement two-way communications with an electric power supplier about electric power information, out of a passive role only receiving electricity.

Moreover, there have been increasing demands for a home or business electric power supply network system and a managing method thereof, which can determine a power-rate in real-time, when the electric appliances are used, and peak-time of the power-rate for the user to retrain from using the electric appliances in the peak-time as possible and to save the power-rate accordingly.

SUMMARY OF THE DISCLOSURE

Accordingly, the present invention is directed to an electric appliance and a control method thereof.

An object of the present invention is to provide an electric appliance which can control operation thereof flexibly according to electric power information changing for each time period and state information based on implementation of an operation mode to save the power-rate to be paid in accordance with the usage of electric power and to improve user convenience, and based on the power-rate information including changeable unit price of the electric power to bill the power-rate in accordance with electric power demand information that expresses a variation of electric power demand in consumers, and a control method thereof.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electric appliance includes a communication device connected with a smart grid net to recognize electric power information including power-rate information for each time period; a sensing device configured to sense a predetermined operation mode and an operation state according to the operation mode; and a control device configured to implement power-saving operation based on the received electric power information and the state information sensed by the sensing device.

In another aspect of the present invention, a control method of an electric appliance includes steps of: recognizing electric power information and an operation mode set for an electric appliance; determining whether the current time is in an on-peak time period in which the billed power-rate is a predetermined reference or more or an off-peak time period in which the billed power-rate is a predetermined reference or less; and controlling an operation of a power consuming part to implement a power-saving mode or a preset operation mode in consideration of the operation time required to implement the operation mode and the on-peak time period.

According to the present invention, there may be following advantageous effects.

First of all, the user may be provided with electric power information when operation of the electric appliance is implemented. As a result, user's reasonable cycle selection and power-saving implementation may be possible.

Furthermore, a normal time period or peak time period relating to the power-rate may be provided periodically or at an every time period changing point. As a result, the user's reasonable cycle selection and power saving operation may be possible.

Still further, the user may be provided with power consumption according to the operation of the washing machine, the expected amount of greenhouse gas emission according to the energy source and the power-rate. As a result, the user may consider the power consumption, greenhouse gas and power-rate according to usage of the washing machine.

Still further, electric power demands may be distributed and the peak electric power may be reduced. As a result, the present invention may be contributed to establishment of Smart Grid and overall energy saving.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
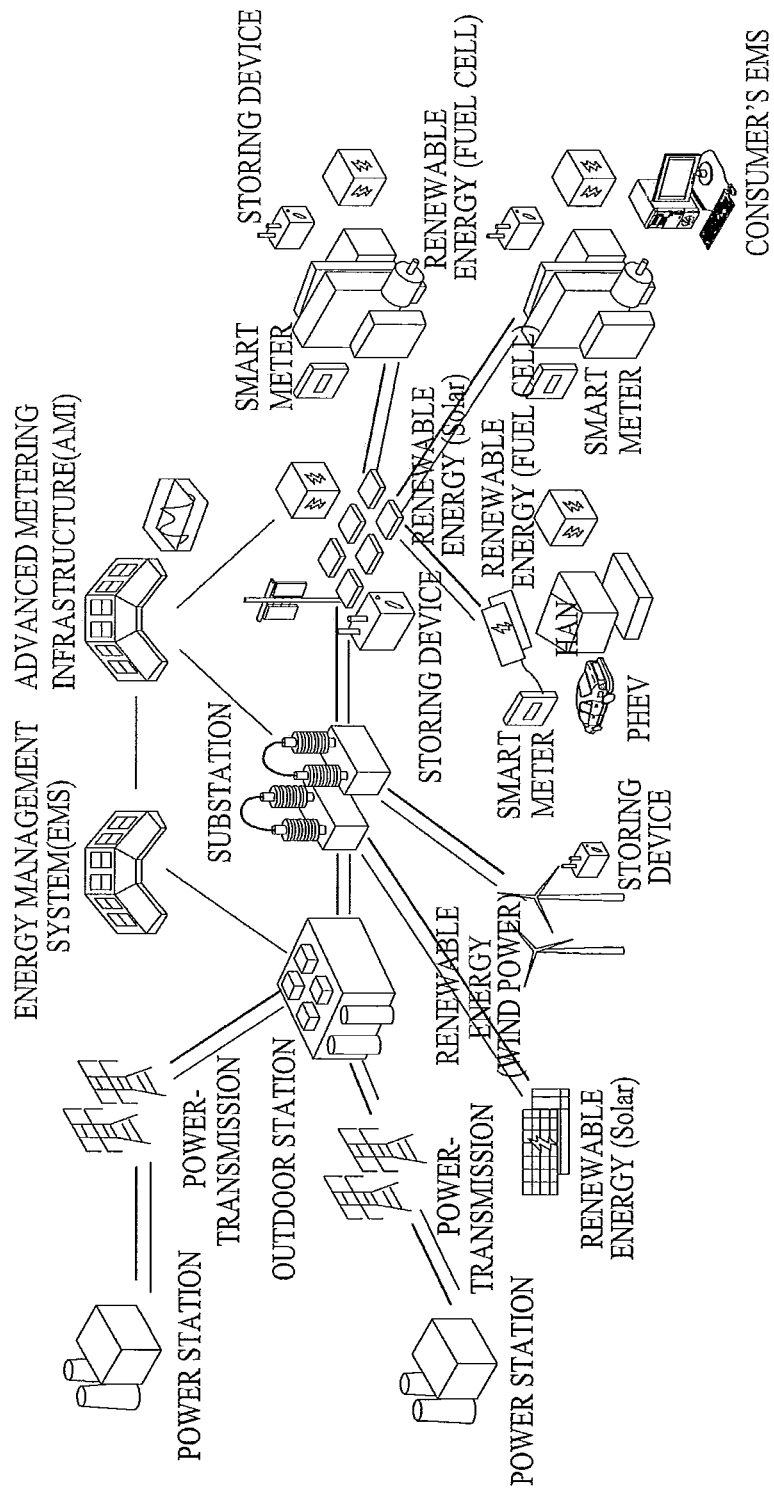
FIG. 1 is a diagram schematically illustrating Smart Grid.

FIG. 1 is a diagram schematically illustrating Smart Grid and Smart Grid includes an electric power station for generating electricity by way of nuclear power generation or hydroelectric power generation and a solar power station and a wind power station which use renewable energy such as sunlight and wind power.

The electric power station, unclear power station or hydroelectric power station transmits electricity to an outdoor station via a power cable and the outdoor station transmits the electricity to a substation to enable the electricity distributed to electricity buyers, for example, households and offices.

The electricity generated by renewable energy is transmitted to the substation to be distributed to each of the electricity buyer and the electricity transmitted from the substation is distributed to each of offices and households via an electric power storage device.

Households using Home Area Network (HAN) may generate and supply electricity by using sunlight and a fuel cell mounted in PHEV (Plug in Hybrid Electric Vehicle) and they may sell remaining electricity to others.

With a smart metering infrastructure, an office or household may recognize the electric power and power rates used therein. Because of that, a user may recognize the current electric power and electric rates and he or she may take measures to reduce power consumption or power rates depending on the circumstances through unit prices for billing the power-rate or the power-rate information for used electric power that are notified from some electric power company.

EMS (Energy Management System) employed for real-time electric power management and real-time power consumption prediction and AMI (Advanced Metering Infrastructure) for real-time metering of the power consumption are important in the Smart Grid.

Here, AMI under Smart Grid is basic technology for integrating consumers based on open architecture and AMI enables the consumers to use electricity efficiently and electric power suppliers to manage the system by detecting an error of the system.

Here, the open architecture is a reference for all kinds of electric appliances to be connected to each other in Smart Grid, regardless of manufactures thereof, in comparison to the conventional communication network.

As a result, the metering infrastructure used in the smart grid makes possible consumer-friendly efficiency such as 'Prices to Devices'.

That is, a real-time price signal of the electric power market or billed power-rate information or unit prices information for billing are delivered via EMS installed in each of the households and EMS communicates with each of the electric appliances to control. As a result, the user recognizes electric power information of each electric appliances after seeing EMS, and he or she implements electric power information process, for example, power consumption or setting of power-rate limit based on the recognized power information.

Here, EMS may be configured of a local EMS used in the offices or household and a center EMS for processing information acquired by the local EMS.

As the real-time communication related to the electric power information between the supplier and consumer is possible in the smart grid, 'real-time Grid response' may be actualized and high expense cost for peak demand may be reduced.

Figure 2:
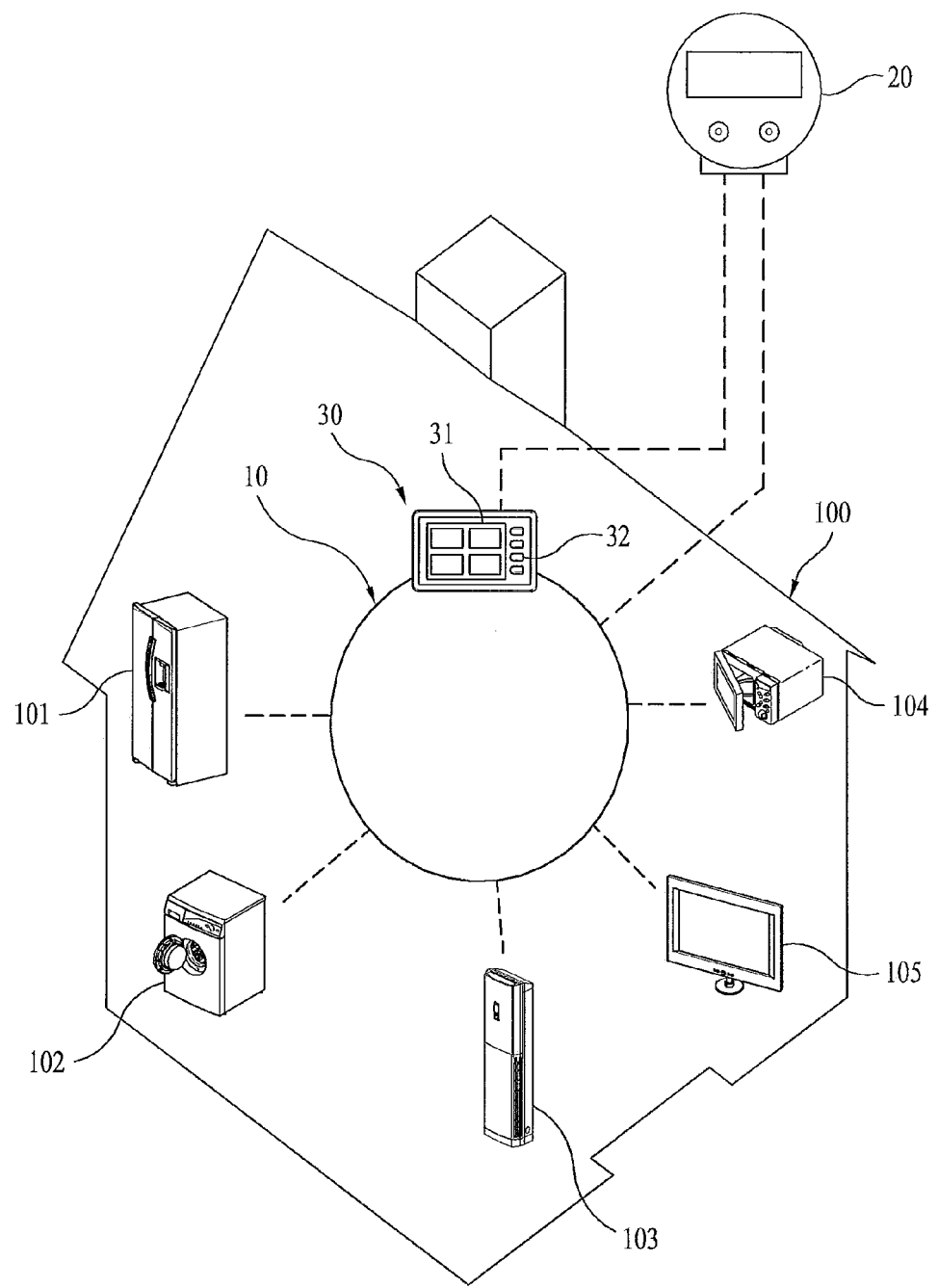
FIG. 2 is a diagram schematically illustrating an electric power management network installed in a household.

FIG. 2 is a diagram illustrating an electric power supply network 10 used in the household.

The electric power supply network 10 includes a smart meter 20 capable of measuring the electric power supplied to each of the households and the power rates in-real time or an energy management system (EMS) 30.

Here, the power rates may be billed based on a pay-by-time system. Such the pay-by-time power rates may be increased in hours having radically increased electric power consumption and it may be decreased in hours having relatively less power consumption such as night hours.

The EMS 30 includes a screen 31 for displaying current electricity consumption and external environments (e.g. temperature and humidity). The EMS may be a terminal including a button-typed input device 32 for allowing the user to operate.

The EMS 30 or the smart meter 20 may be connected with electric appliances including a refrigerator 101, a washing machine 102, an air conditioner 103, TV 105, a cooking appliance 104 and a TV 105, only to two-way communicate with the electric appliances.

Communication inside the house may be implemented via wireless or wires such as PLC.

Each of the electric appliances may be connected with the other electric appliances to implement communication.

Figure 3:
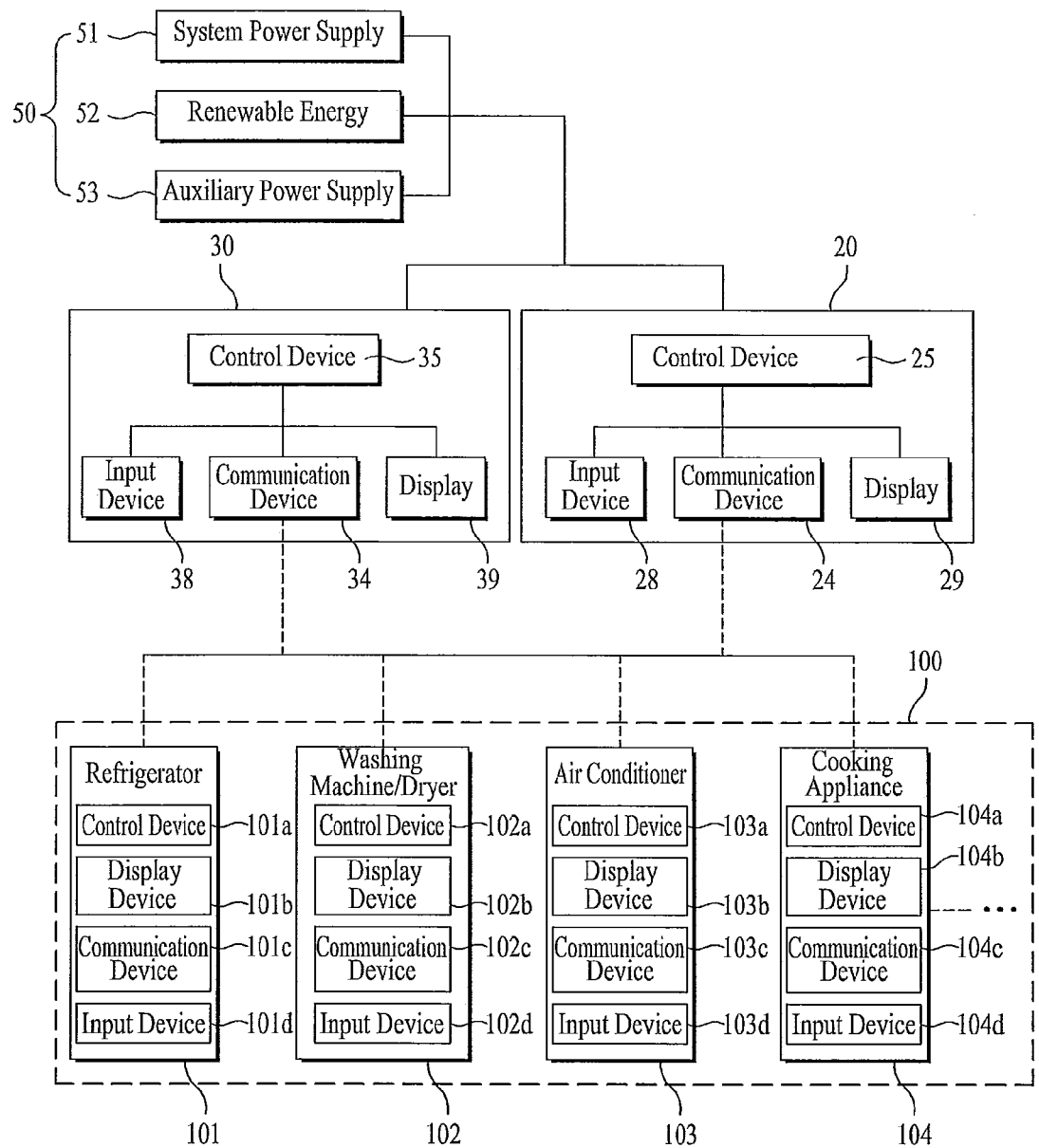
FIG. 3 is a control block view of the electric power management network.

FIG. 3 is a control block view of the elements connected via an energy management system (EMS).

Here, a system power supply 51 is a power supply source supplied by an electric power company including a conventional power generation facility for thermal, nuclear and hydroelectric power.

The EMS further includes a renewable energy supply 52, that is, a self-generation facility, such as wind or solar power generation and an auxiliary power supply 53 such as a fuel-cell or storage battery which can be provided in a fuel-cell vehicle or a household.

Such a power supply 50 is connected with the smart meter 20 and the EMS 30.

The smart meter 20 and the EMS 30 are able to communicate with the electric appliances.

Here, the EMS 30 includes a control device 35, an input device 338, a communication device 34 and a display 39. The smart meter 20 includes a control device 25, an input device 28, a communication device 24 and a display 29.

Each communication device 34 and 24 may be connected to communicate with a communication device 101c, 102c, 103c and 104c provided in each of the electric appliances installed in a household, including a refrigerator 101, a washing machine or a dryer 102, an air conditioner 103 and a cooking appliance 104.

The EMS 30 or the smart meter 20 may transmit real-time power information to the communication device (101c, 102c, 103c and 104c.

The control device 25 and 35 provided in at least one of the EMS 30 or the smart meter 20 recognizes setting information inputted by the user via the input device 32, cumulative history information on the operations of the electric appliances and electric power consumption history information and external electric power supply, in real-time.

The control device may process the variety of the information in real-time to control the operations of the electric appliances and to control the electric power supplied to the electric appliances.

The display 29 and 39 displays the electric power information supplied by the electric power supply and communication information among the electric appliances.

The most important role of the EMS 30 and the smart meter 20 is to provide the electric appliances with a power-saving mode to save the power-rate, power consumption and carbon dioxide emission, when the electric appliances are put into operation.

Figure 16:
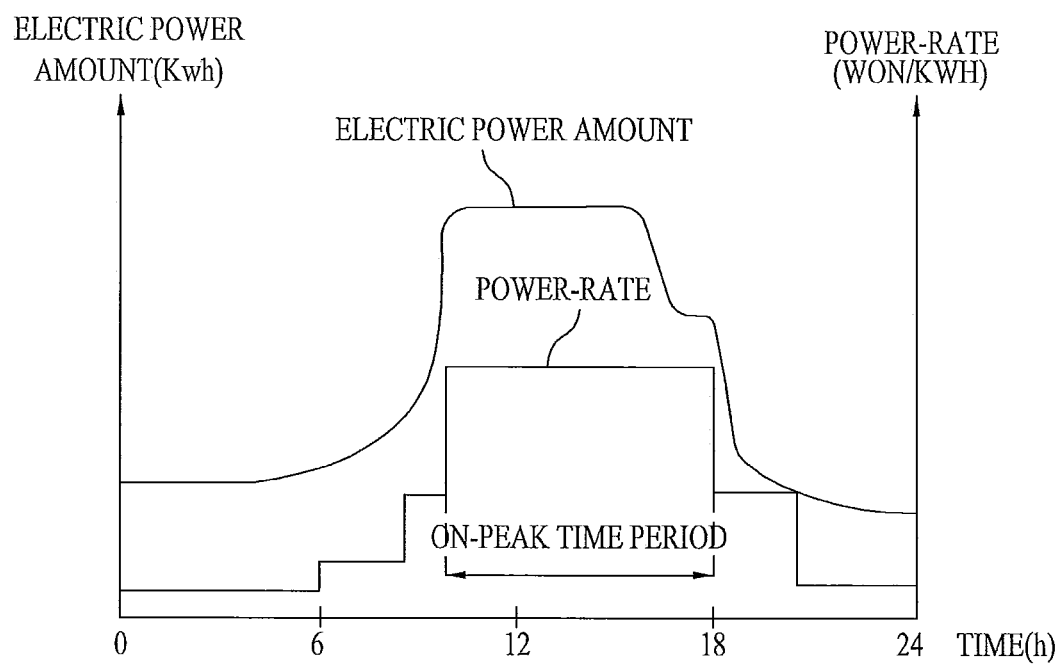
FIG. 16 is a graph of power-rate change.

The power-saving mode configured to save the power-rate is implemented based on information relating to the power-rate under a variable-payment system (see, FIG. 16) in which the power-rate is variable according to the usage time of an electric appliance.

The EMS 30 or the smart meter 20 may be employed to control the electric appliance in consideration of a peak-time when the highest power-rate is billed or power consumption or an upper or an predetermined limit target value of the power-rate.

Here, to implement the power-saving mode, the EMS or the smart meter 20 may be subscribed to a power management program provided by the central operation body of the power management program such as a power company.

Under the electric power management system after subscribed to the power management program, the power-rate can be saved and a power-rate cutting policy provided by the electric power company can be shared advantageously.

The control device (101a, 102a, 103a and 104a), the display device (101b, 102b, 103b and 104b), the communication device (101c, 102c, 103c and 104c) and the input device (101, 102, 103 and 104) are provided in the electric appliance (100; 101, 102, 103 and 104) such that a current communication state may be displayed and that the user's command may be inputted.

The communication device (101c, 102c, 103c and 104c) is in communication with and connected with the EMS 30 or the smart meter 20 and a command transmitted from the electric power management program via them may be implemented in the electric appliance 100 by the control device (101a, 102a, 103a and 104a).

To implement the power-saving operation, the control device (101a, 102a, 103a and 104a) installed in the electric appliance self-determines whether the current time is in the peak time period based on the electric power information transmitted from the EMS 30 or the smart meter 20.

Here, the power-saving operation is not configured of a single operation mode and a variety of operation modes set in consideration of the power consumption and the size of the power-saving with respect to the power-rate.

In reference to FIG. 4, the washing machine 102 out of the electric appliances and a control method of the washing machine will be described.

Figure 4:
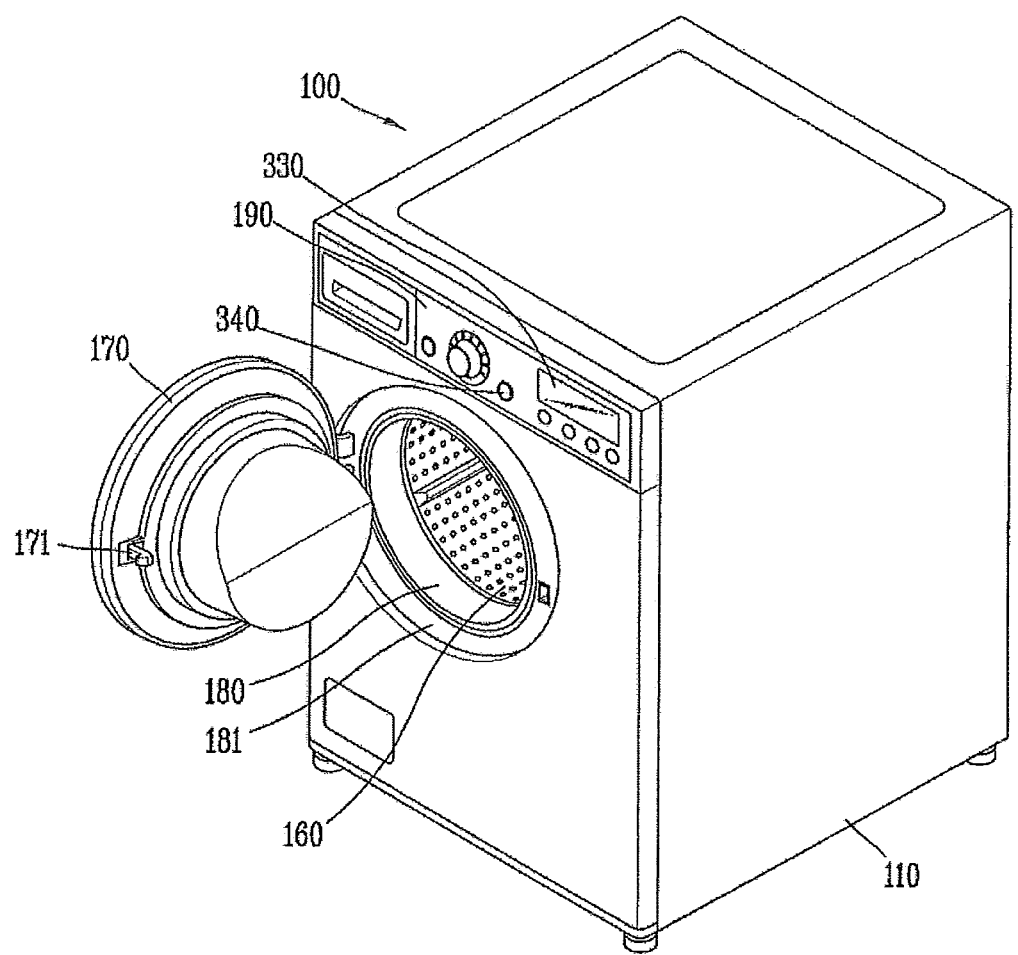
FIG. 4 is a perspective view illustrating a washing machine according to the present invention.
Figure 5:
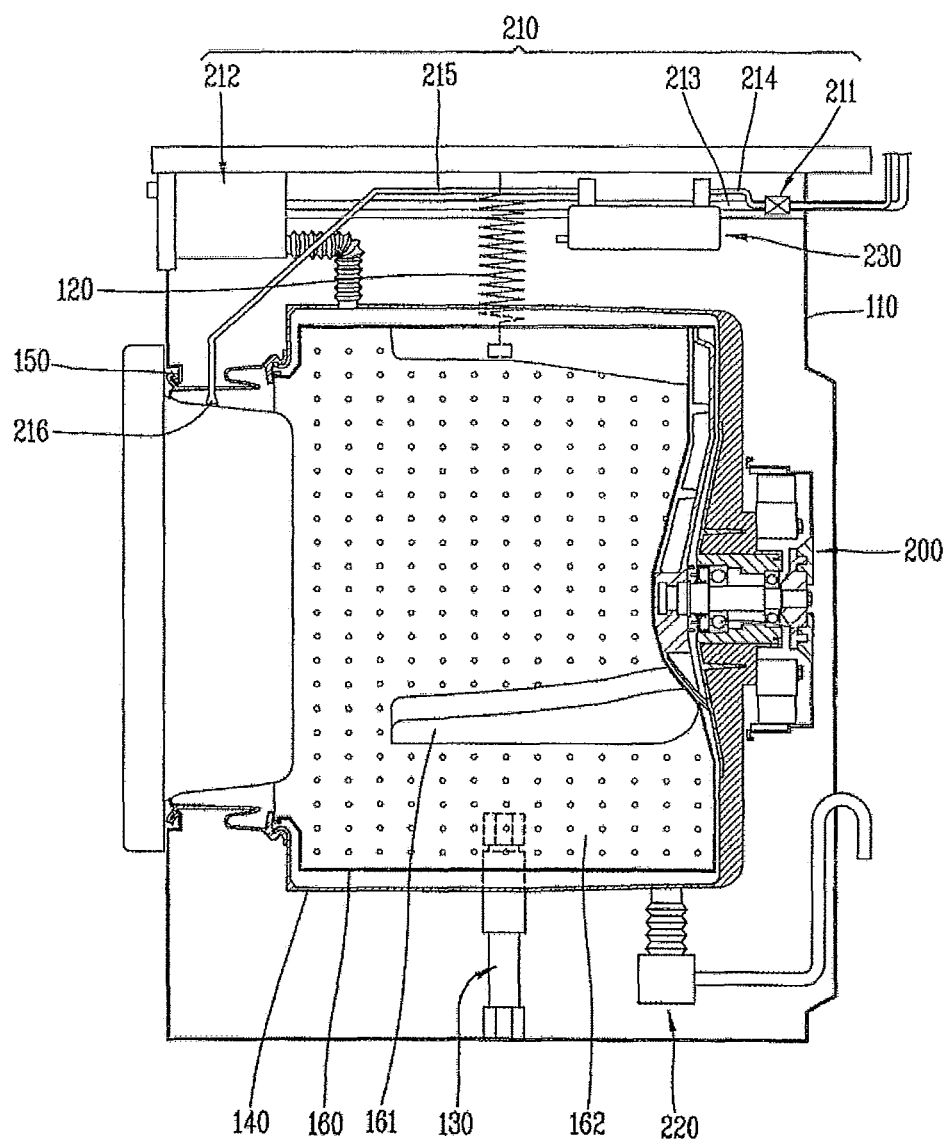
FIG. 5 is a side sectional view illustrating the washing machine according to the present invention.

In reference to FIGS. 4 and 5, the washing machine which is a drum type washing machine includes a cabinet 110 having an opening 181 formed therein to introduce laundry, a door 170 configured to open and close the opening 181, a tub 140 suspendingly installed in the cabinet 110 to hold wash water, water supplying means 104 configured of water supply paths 213 and 214 to supply the wash water to the tub 140, a drum 160 rotatably mounted in the tub 140 to accommodate laundry therein, a motor 200 mounted to the tub 140 to rotate the drum 160, and a door switch 171 configured to lock or unlock the door 170.

A gasket 180 may be installed along a circumference of the opening 181 to seal a gap formed between the opening 181 and the tub 140.

Here, the gasket 180 is a ring-shape having a predetermined height and a center of the gasket 180 is corrugated and overlapped. That is, the gasket 180 which looks surrounding the door 170 has an overlappedly corrugated portion.

A control panel 190 is formed in an upper portion of a front part of the washing machine 102. in the control panel 190 may be formed an output part 330 configured to display a variety of information including usage information of the drum type washing machine 100, a plurality of control devices including an input device 340 configured to allow a user or a manager to input commands, an input device and a display device.

A control device 300 is provided in the control panel 190 and the control device 300 controls the washing machine 102 including the output part 330 based on an input signal transmitted from the plurality of the input devices or a control algorithm embedded therein. Here, the control device 300 may be provided in another predetermined portion of the drum type washing machine 100.

More specifically, in reference to FIG. 5, the drum type washing machine includes the cabinet configured to define an exterior appearance thereof, the tub 140 hung by a spring 120 within the cabinet 110, with supported by a damper assembly 130 simultaneously, the drum 160 rotatably mounted in the tub 140 to accommodate the wash water and the laundry therein, a plurality of lifts 161 projectedly installed in an inner surface of the drum 160, spaced apart a predetermined distance from each other, to lift and drop the laundry along the rotation of the drum, the motor 200 mounted to the rear part of the tub 140 in connection with the drum to rotate the drum 160, and a steam generating device 230 provided beyond the tub 140 to heat the wash water into high-temperature-high-pressure steam and to supply the steam to the tub 140 and the drum 160.

As shown in the drawing, an outlet of the steam generating device 230 may be in communication with an inner space of the tub 140.

Also, the drum type washing machine further includes water supply means 210 installed beyond the tub 140 to supply wash water to the tub 140 and the drum 160 and a water drainage device 220 installed below the tub 140 to drain the wash water inside the tub 140 and the drum 160. The steam generating device 230 is connected with the water supply means 210.

Specifically, the water supply means 210 includes a water supply valve assembly 211 installed in a rear surface of the cabinet 110 to adjust water supply, a detergent box assembly 212 provided between the water supply valve assembly 211 and the tub 140 to hold detergent therein, first and second water supply paths 213 and 214 branched from the water supply valve assembly 211 to be connected with the detergent box assembly 212 and the steam generating device 230, respectively, and a seam path 215 having an end connected with the steam generating device 230 and the other end located inside the drum 160 to supply steam to the tub 140 and the drum 160.

Here, the drum 160 includes a plurality of dehydrating holes 162 formed in an inner circumferential surface thereof to enable the wash water to flow therein and toward the tub 140 and to flow from the laundry by way of a centrifugal force during the spinning. The water supply valve assembly 211 and the water drainage device 220 may include a water supply valve (not shown) and a water drainage pump (not shown), respectively, to supply and drain the wash water according to the operation of the water supply valve and the water drainage pump.

Figure 6:
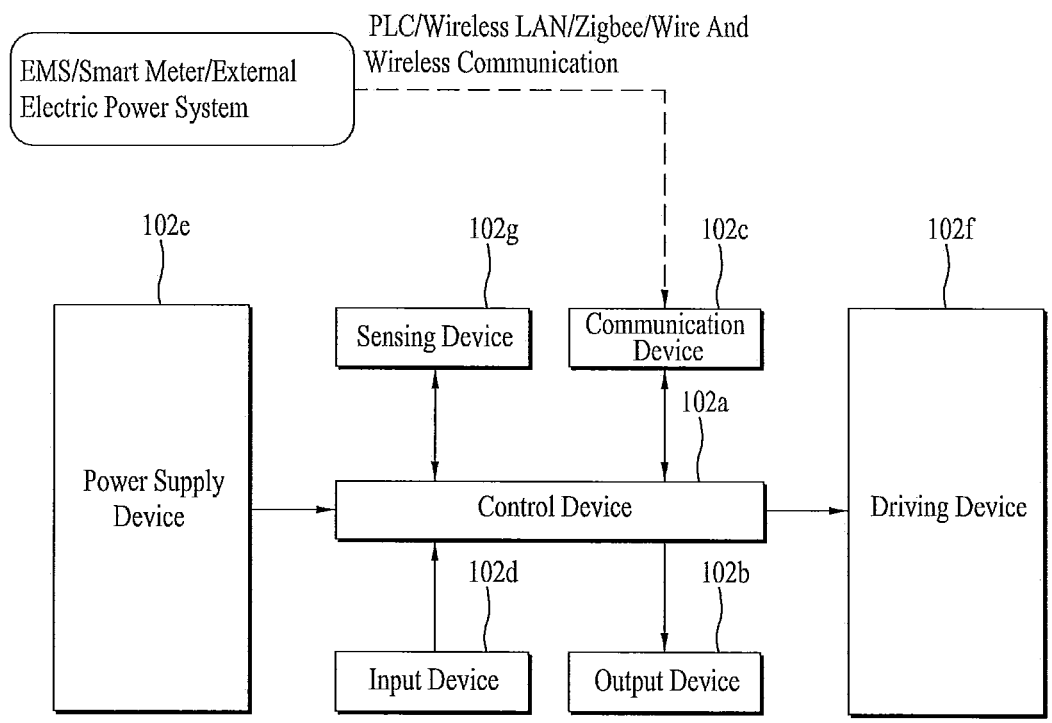
FIG. 6 is a block view schematically illustrating a configuration of a control device provided the washing machine according to the present invention and predetermined parts provided near the control device.
Figure 7:
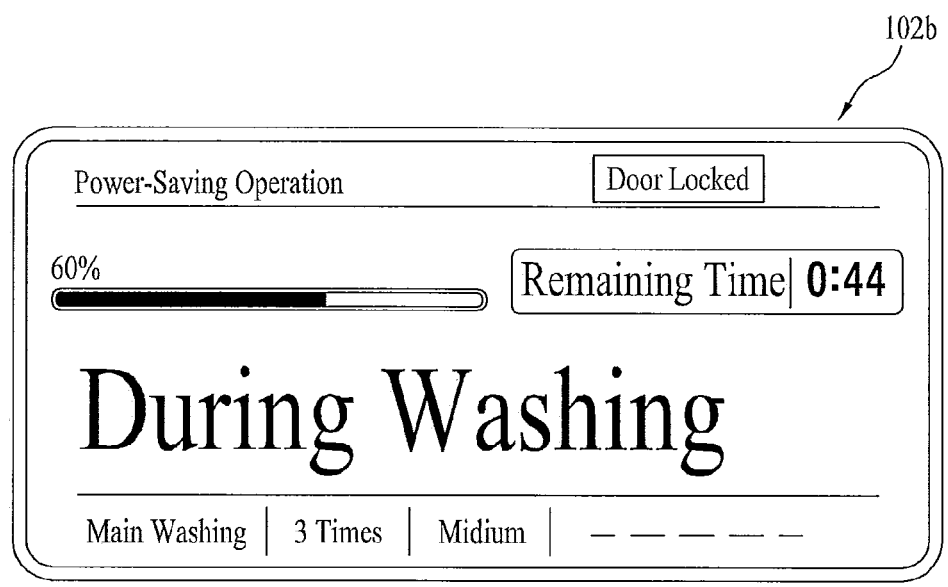
FIG. 7 is a screen illustrating an embodiment of an output part provided in the washing machine according to the present invention.

In reference to FIG. 6, the washing machine according to the present invention may include an input device 102d to allow the user to input a selected operation mode of the washing machine and to input a selected cycle, a communication device 102c connected with an external device via a wire or wirelessly to receive the electric power information and a control device 102a configured to implement the cycle based on the selected operation mode and the electric power information.

At this time, the electric power information includes information relating to an off-peak time period and an on-peak time period.

Also, the electric power information may includes "highly billed rate time period" that means certain time period in which the billed rate is over certain predetermined level which is able to be defined by consumer's choice considering the information relating to the unit prices of the electric power or which is able to defined by the electric power supplier.

The on-peak time period is a time period in which a higher power-rate is billed, compared with the off-time time period.

The electric power supplier which manages the system power source (51, see FIG. 2) sets a time period having overall power consumption increased enough to lower a remaining amount of the electric power to be a predetermined value or less as 'on-peak time period' or "highly billed rate time period" based on statistical data or real-time measurement.

As a result, the electric power supplier bills a high-power-rate in the on-peak time period or highly billed rate time period to adjust the usage of the electric power.

The off-peak time period is a time period except the on-peak time period, or non-highly billed rate time period is a time period except the highly billed rate time period.

The information on the on-peak time period (or highly billed rate time period) and the off-peak time period (or non-highly billed rate time period) may be pre-stored in at least one of the power relating device, such as the smart meter (20, see FIG. 2) and the EMS (30, see FIG. 2) and external electric power system.

In addition, the electric power supplier may provide the user with information on the power-rate in real-time to allow the user to recognize the one-peak time period and the off-peak time period.

The communication device 102c is connected with the external device via a wire or wirelessly and it receives the electric power information. The wire or wireless communication may be any communication type which can transmit and receive data, for example, electric wire communication, wireless LAN, Internet, Zigbee, serial communication and the like. The communication device 102c may transmit information on the amount of the electric power required by the washing machine, the power-rate and the amount of greenhouse gas emission via the wire or wireless communication outside.

The user may set an operation mode via the input device 102d, for example, one of normal and power-saving modes.

The control device 102a implements the selected cycle in the normal operation mode, when the current time belongs to the off-peak time period or the non-highly billed rate time period based on the received electric power information, and it implements the selected cycle in the user's set mode, when the current time belongs to the on-peak time period or the highly billed rate time period based on the received electric power information.

That is, when the user sets the washing machine to operate in the normal operation mode, the control device 102a of the washing machine implements the cycles in the normal operation mode, even with the electric power information that the current time belongs to the on-peak time period or the highly billed rate time period. In contrast, when receiving the electric power information that the current time belongs to the on-peak time period or the highly billed rate time period after the user sets the washing machine to operate in the power-saving mode, the control device of the washing machine implements the cycles of the washing machine in the power-saving mode. The operation mode may be set to change according to preset conditions automatically, if necessary.

The washing machine according to the present invention further includes a power supply part 102e connected with an external power supply to supply the electric power to the washing machine, a sensing device 102g configured to sense washing machine-state-information including the amount of laundry and the temperature of supplied water, a display device 102b configured to display the operation mode and cycle inputted via the input device 102d or under the current implementation, and a driving device 102f configured to drive the motor, heater and fan according to a control signal of the control device.

The power supply device 102e receives the external power supply, that is, a commercial-usage alternating power source and it outputs a direct current voltage to drive the circuit composing the washing machine and the control device provided therein.

Typically, the power supply device 102e may be Switched-Mode Power Supply (SPMS).

Of course, the power supply device 102e may be the other types of electric power switching devices. The switched-mode power supply rectifies and equalizes the alternating current voltage of the external power supply to covert it into a direct current voltage. After that, the power supply device 102e converts the direct current voltages into driving voltages proper to drive the washing machine and the control device of the washing machine by using a converter such as a high frequency transformer and regulator.

The sensing device 102g senses the amount of the laundry and the temperature of the supplied water and it transmits information on the sensed amount and temperature to the control device 102a.

At this time, the control device 102a may calculate the expected-power consumption and the expected-power-rate of the washing machine based on one of the preset cycle, the sensed laundry amount and the sensed water temperature.

The sensing device 102g senses a variety of state-information required to process the typical cycles of the washing machine. There may be further provided a water-level sensor, a rinsing-level sensor, a laundry-eccentricity sensor and a washing machine-vibration-level sensor.

The sensing device 102g transmits the information sensed by the sensors to the control device 102a.

The display part 102b displays the operation mode inputted via the input device 102d and the cycle the washing machine is supposed to implement, or it displays the operation mode and cycle which are under implementation currently.

The driving device 102f drives loads generated to implement each of the cycles based on a driving signal transmitted from the control device 102a. specifically, the driving device 102f drives the loads of the motor (200, see FIG. 5) configured to rotate the drum, the heater configured to heat the water supplied for a soaking course, the heater configured to generate steam, the heater configured to heat air to dry the laundry and a fan and fan motor configured to generate air currents required for a drying course.

Although the configuration elements of the washing machine are described above, the configurations of the control device 102a, the display device 102b, the communication device 102c, the input device 102d, the power supply device 102e, the driving device 102f, the sensing device 102g may be applicable to the other electric appliances, that is, the refrigerator (101, see FIG. 2), the air conditioner (103, see FIG. 2), the cooking appliance (104, see FIG. 2) and TV (105, see FIG. 2).

In this case, a driving device of the refrigerator 101 is connected with a compressor, a cooling fan motor, an icemaker, a display device, a defrosting heater. A driving part of the air conditioner may be connected with a compressor provided in an outdoor unit, an outdoor fan motor, an indoor fan motor provided in an indoor unit and a display device.

A driving part of the cooking appliance may be connected with a display device and a heater.

Figure 8:
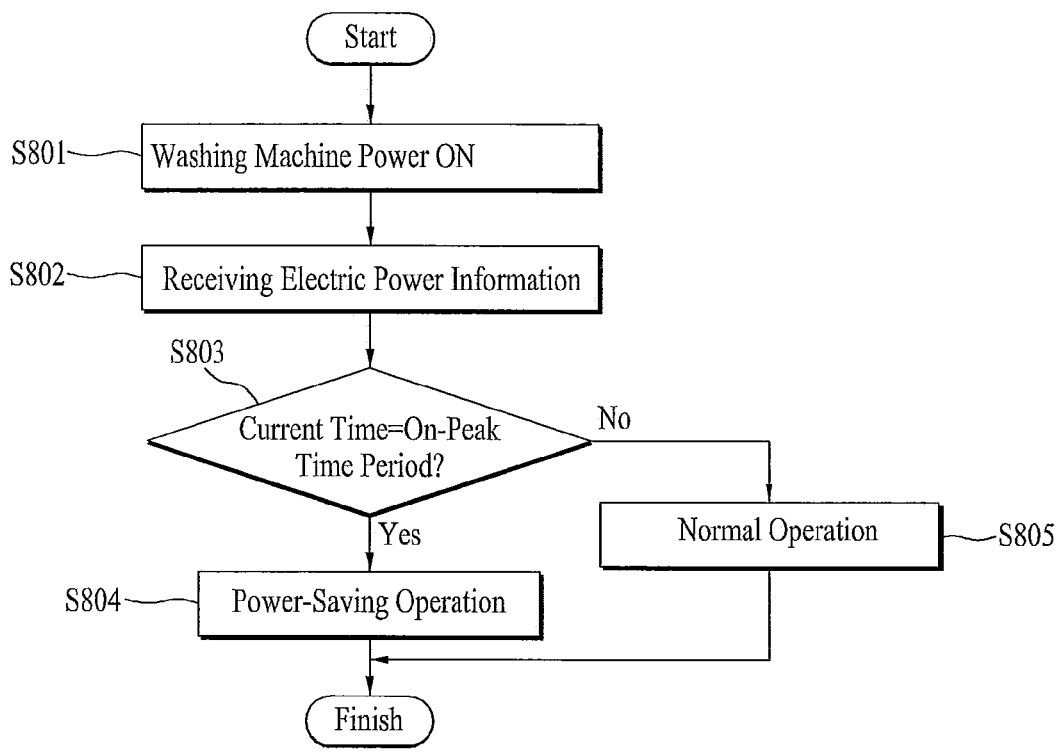
FIGS. 8 to 11 are control flow charts of the washing machine according to the present invention.
Figure 9:
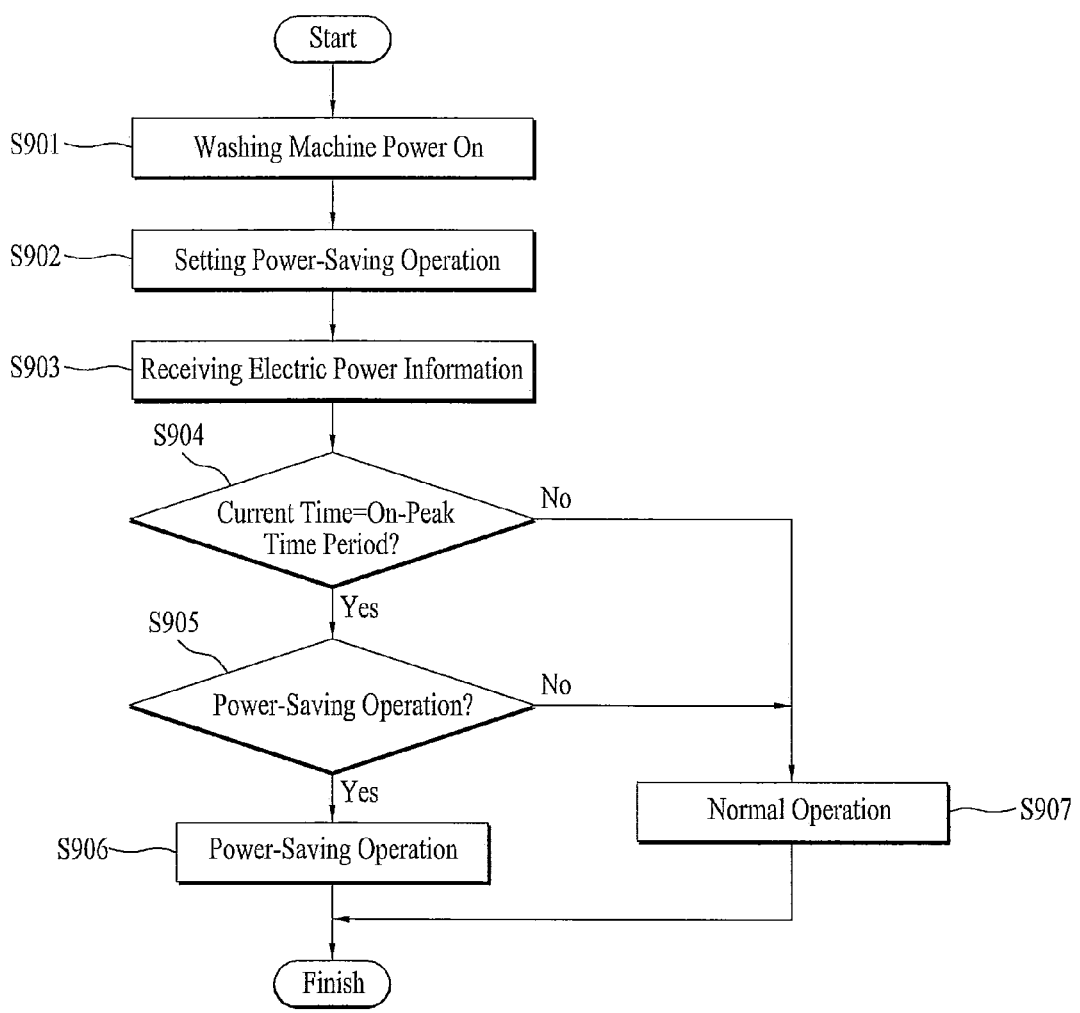

In reference to FIG. 8, after applying a power supply to the washing machine (S801), a control method of the washing machine according to an embodiment of the present invention includes a step of receiving an input signal of a cycle to be implemented by the washing machine (not shown), a step of receiving electric power information on an off-peak time period (or non-highly billed rate time period) and an on-peak time period (or a highly billed rate time period) in which a higher power-rate is billed than the off-peak time (or non-highly billed rate time period), from an external device, and a step of implementing the cycle in a normal operation mode or a power-saving operation mode based on the electric power information (S120).

In the step of implementing the cycle, the cycle is implemented in the power-saving mode in case the current time is in the on-peak time period (or the highly billed rate time period) based on the received electric power information (S804) and the cycle is implemented in the normal mode in case the current time is in the off-peak time period (or non-highly billed rate time period) (S805).

The electric power supplier sets a time period having overall power consumption increased enough to lower a remaining amount of the electric power, which can be supplied to each household, to be a predetermined value or less as 'on-peak time period' or 'highly billed rate time period" based on statistical data or real-time measurement.

As a result, the electric power supplier bills a high-power-rate in the on-peak time period or the highly billed rate time period to adjust the usage of the electric power.

The information on the on-peak time period (or the highly billed rate time period) and the off-peak time period (or non-highly billed rate time period) may be pre-stored in at least one of a electric power relating device, such as Home Server and Smart Meter, installed in the household and an external electric power system.

In reference to FIG. 6, after applying a power supply to the washing machine (S901), a control method of a washing machine according to another embodiment of the present invention includes a step of receiving an input signal of implementing a cycle of the washing machine (not shown), a step of allowing a user to set the normal operation mode or the power-saving operation mode (S902), a step of receiving electric power information on an off-peak time period (or the highly billed rate time period) and an on-peak time period (or non-highly billed rate time period), in which a higher-power-rate is billed than the other time periods, from an external device, and a step of implementing the cycle in the normal operation mode or the power-saving operation mode based on the received electric power information (S904).

The washing machine implements the cycle in the normal operation mode, when the current time is in the off-peak time period (or non-highly billed rate time period) based on the received electric power information (S907).

The washing machine implements the cycle in the set operation mode, when the current is in the on-peak time period (or the highly billed rate time period) based on the received electric power information.

That is, it is determined in the step of S902 whether the power-saving operation mode is set (S905). If the power-saving operation mode is set based on the result of the determination, the cycle is implemented in the power-saving operation mode (S906). If the power-saving mode is not set based on the result of the determination, the cycle is implemented in the normal operation mode (S907).

The user may set the operation modes, that is, one of the normal and power-saving operation modes.

Based on the received electric power information, the washing machine implements the cycle in the normal operation mode when the current time belongs to the off-peak time period (or the highly billed rate time period) and it implements the cycle in the user's set operation mode when the current time belongs to the on-peak time period (or the highly billed rate time period).

That is, even through the electric power information is received that the current time is in the on-peak time period when the user sets the washing machine in the normal operation mode, the cycles of the washing machine are implemented in the normal operation mode.

In contrast, when the electric power information is received that the current time is in the on-peak time period (or the highly billed rate time period) after the user sets the washing machine to operate in the power-saving operation mode, the cycles of the washing machine are implemented in the power-saving operation mode.

In this case, if the power-saving mode includes a delay of performing certain function until a termination of the on-peak time period (or the highly billed rate time period) and such delay is occurred during the on-peak time period (or the highly billed rate time period), an expected remaining time to resume the delayed function is output or displayed.

Also, as the type of the termination of the operation (for example, washing or rinsing or spinning (dehydration)) is or informed visually or in audio, the user is able to conduct each situation.

The operation modes may be set to automatically change according to predetermined conditions, if necessary.

Figure 10:
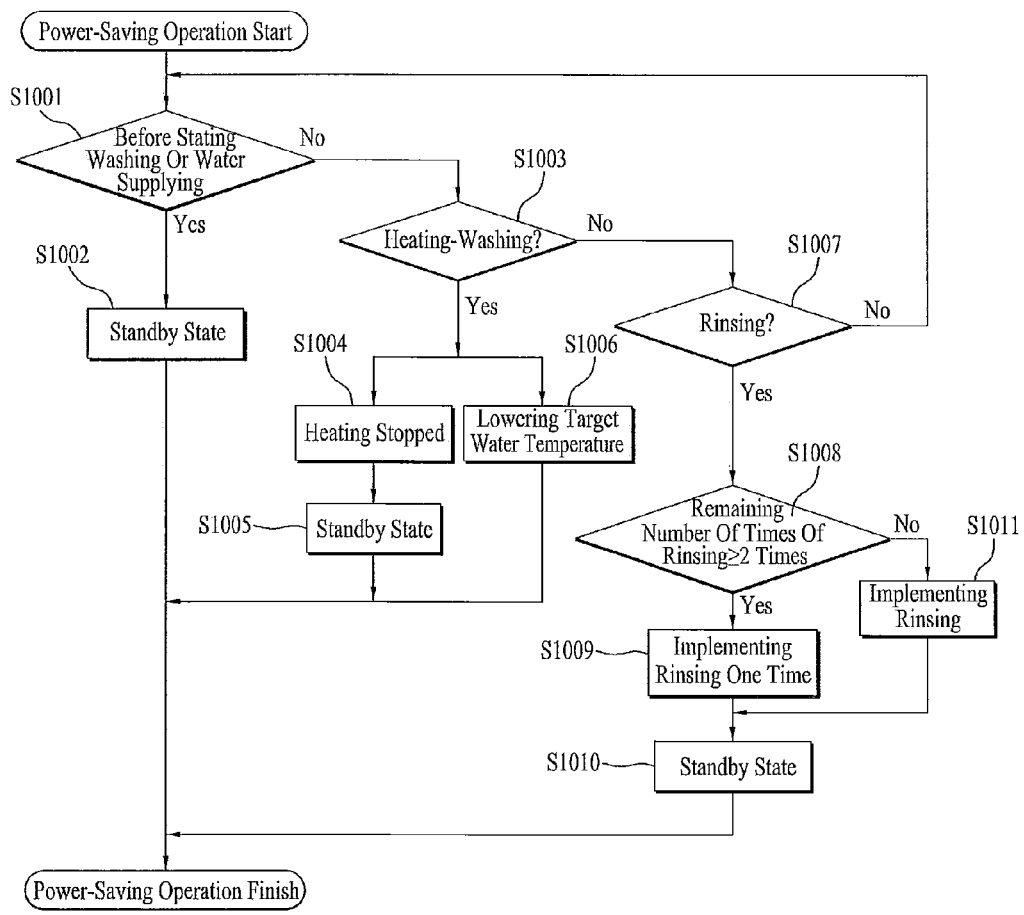

In reference to FIGS. 10 and 11, the step of the power-saving operation composing the control method of the washing machine according to the present invention will be described as follows.

According to the control method, the power-saving operation mode is set by the user and the communication device (102c, see FIG. 6) receives the electric power information relating to the on-peak time period (or the highly billed rate time period). If then, it is determined which cycle of the washing machine is implemented, when the electric power information is received, and the cycle of the washing machine is implemented according to the result of the determination.

It is determined whether the washing machine is before a washing cycle or before a water-supplying cycle, at the moment when the electric power information is received, (S1001). When the time required by the washing cycle and water-supplying cycle is overlapped with the on-peak time period (or the highly billed rate time period), with the receiving of the electric power information being before the washing cycle or the water-supplying cycle, the control device (102a, see FIG. 6) is controlled to stand by (S1002).

However, if the efficiency of the washing could be improved considering overall cost, although the current time belongs to the on-peak time period (or the highly billed rate time period), the water-supplying cycle may be performed.

In case the timing of receiving the electric power information is in the middle of a heating-washing cycle (S1003) when the washing cycle or the water-supplying cycle starts in the step of S1001, the control device 102a stops the heating step of the washing cycle of the washing machine (S1004) and it controls the heating step on standby until the finish of the one-peak time period (or the highly billed rate time period) (S1005).

Selectively, a heating target temperature of the water is lowered to reduce the heater usage and the electric power usage is reduced accordingly (S1006).

When the step of S1003 determines that the timing of receiving the electric power information is not in the middle of the heating step of the washing cycle, it is determined whether the rinsing cycle is in progress currently (S1007).

When the timing of receiving the electric power information is in the middle of the rinsing cycle, it is determined whether the remaining number of the rinsing cycles is two or more (S1008). When the remaining number of the rinsing cycles is less than two, that is, one or it is zero, the rinsing cycle may be implemented as it is (S1011).

When the remaining number of the rinsing cycles is two or more in the step of S1008, the rinsing cycle is implemented one time (S1009) and the rinsing cycle is on the standby until the on-peak time period (or the highly billed rate time period) finishes (S1010).

Alternatively, since the power usage of the rinsing cycle is not to much, the rinsing cycle may implemented completely without the step of S1011 and then the washing machine may on the standby state until the on-peak time period (or the highly billed rate time period) finishes.

Figure 11:
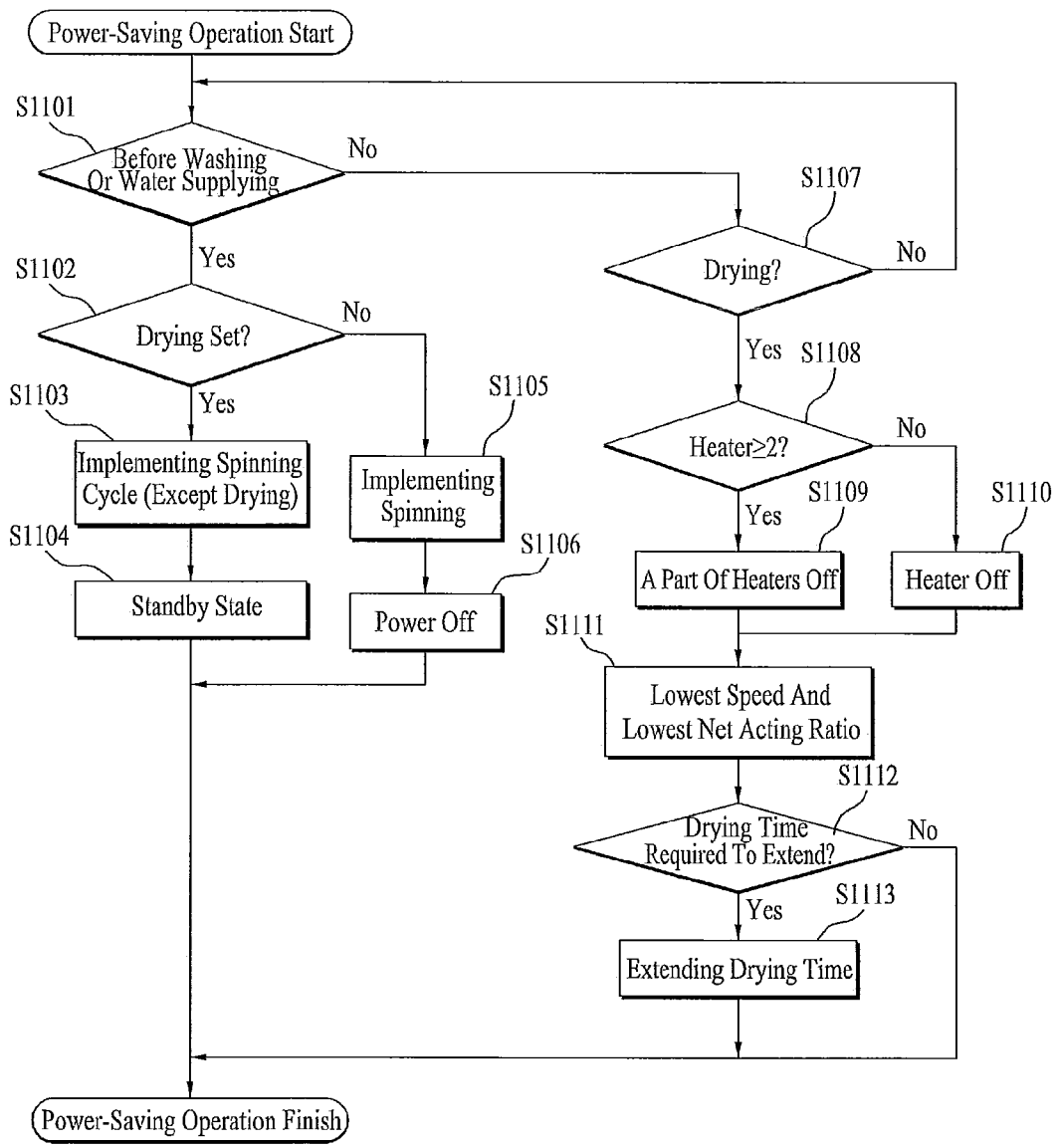

As shown in FIG. 11, it is determined whether the timing of receiving the electric power information is in the middle of a main-spinning cycle including a drying step (S1101).

When it is determined to be in the middle of the main-spinning cycle, it is determined whether a drying cycle is set to operate with implementing the spinning cycle simultaneously (S1102).

In case the drying cycle is set to operate, only the spinning cycle is implemented except the drying cycle and the washing machine is on the standby state until the on-peak time period (or the highly billed rate time period) finishes once the spinning cycle is completed (S1103 and S1104).

When it is determined that a main-spinning cycle not including the drying step is under implementation at the moment of receiving the electric power information in the step of S1102, the spinning cycle is implemented and after that the power of the washing machine is cut off (S1106).

When the timing of receiving the electric power information is determined not to be in the middle of the main-spinning cycle in the step of S1101, it is determined whether the number of the driving heaters is two or more (S1107).

In case the number of the driving heaters is two or more, a part of the heaters is controlled to be off (S1109) and in case the number is one, the heater is controlled to be off or another operation mode ($1^{st}$ step or $2^{nd}$ step or $3^{rd}$ step) according to heating degree (S1110).

The motor configured to rotate the drum is driven at the lowest speed and at the lowest net-operation (S1111).

In the control method of the washing machine according to the present invention, the electric power information may further include the kind of the external power supply and a greenhouse gas level.

At this time, the control method may further include a step of calculating the expected-power-rate and the amount of the greenhouse gas based on the electric power information and a step of outputting at least one of the kind of the external power supply, the greenhouse gas level, the expected power-rate and the amount of the greenhouse gas emission data.

In addition, according to the control method, the expected amount of greenhouse gas emission of an energy source supplied to the washing machine may be calculated based on the calculated expected-power-consumption. For example, the calculated expected-power-consumption is multiplied by a carbon dioxide index of the energy source to calculate a value of the expected carbon dioxide emission amount. Here, the energy source may be fossil fuel such as oil and gas, renewable energy source such as sunlight, solar heat, wind power, tidal power, hydroelectric power and fertility, nuclear power, fuel battery and the like. An index of greenhouse gas according to each of the energy source, for example, the carbon dioxide index may be preset via experiments.

As mentioned above, according to the control device of the washing machine and the control method of the washing machine, the information relating to the current electric power-rate time period is transmitted from the communication device provided in the washing machine to the user via the output, after the power is applied to the washing machine.

After that, the user is allowed to make reasonable selection for power-saving and to enable the power-saving operation mode corresponding to the peak time period. As a result, reasonable energy usage may be induced.

Figure 12:
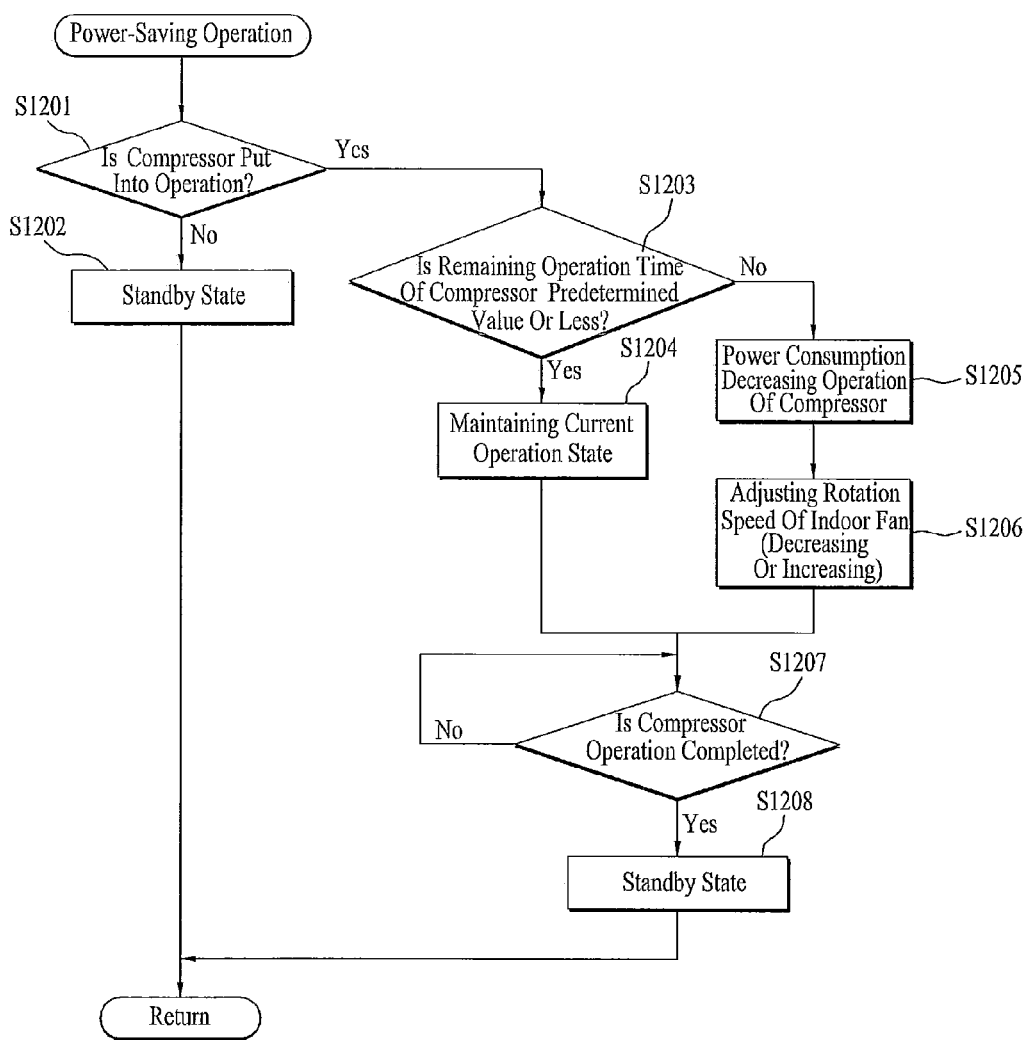
FIG. 12 is a control flow chart of an air conditioner according to the present invention.

FIG. 12 is a flow chart illustrating a power saving operation control of the air conditioner out of the electric appliances.

First of all, it is determined whether the compressor is put into operation (S1201). In case the compressor is not put into operation, the air conditioner is controlled to stand by (S1202). Here, the standby state means a state in which the start of the compressor operation is put on standby until the on-peak time period (or the highly billed rate time period) finishes in case the expected operation time of the compressor belongs to the on-peak time period the on-peak time period (or the highly billed rate time period), with starting before the on-peak time period. Or, if the operation time of the compressor is overlapped with the on-peak time period (or the highly billed rate time period), the operation time of the compressor may be advanced before the on-peak time ((or the highly billed rate time period).

In case the compressor is put into operation based on the result of the determination, it is determined whether the remaining operation time of the compressor is a predetermined value or less (S1203).

In case the remaining operation time of the compressor is the predetermined value or less, a current operational state of the compressor is maintained (S1204). However, in case the remaining operation time is a predetermined value or more, power consumption has to be reduced and a power-consumption-decreasing operation of the compressor is implemented (S1205).

In this case, an operation rate or operation frequency of the compressor is adjusted to implement the power-consumption-decreasing operation.

In the meanwhile, to compensate the decreased cooling ability of the air conditioner because of the power-consumption-decreasing operation of the compressor or the decreased power consumption of the indoor fan motor, the indoor fan motor is controlled and the rotation number of the indoor fan may be adjusted.

In this case, the amount of the air outlet is increased and the rotation number of the fan is increased to compensate the decreased cooling ability: However, if the power consumption of the indoor fan has to be reduced based on the result of the determination, the rotation number of the indoor fan may be reduced.

Hence, it is determined whether the operation of the compressor finishes (S1207). In case the operation of the compressor is completed, the standby state is maintained until the on-peak time period (or the highly billed rate time period) finishes (S1208).

Figure 13:
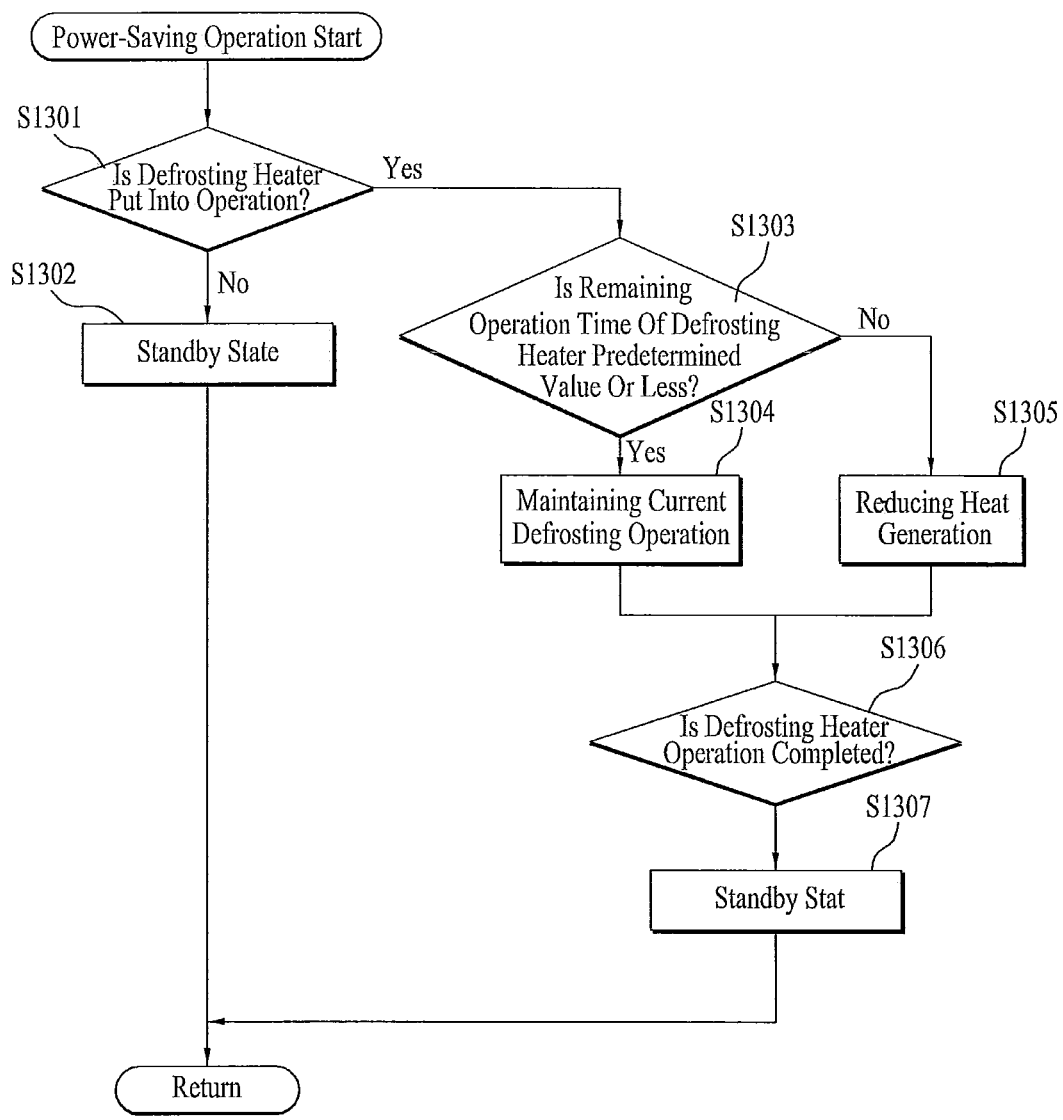
FIGS. 13 and 14 are control flow charts of a refrigerator according to the present invention.

FIG. 13 is a control flow chart of a power-saving operation mode for the defrosting heater provided in the refrigerator out of the electric appliances.

First of all, it is determined whether the defrosting heater is put into operation (S1301). In case the defrosting heater is not put into operation currently, that is, before the defrosting heater is put into operation, the standby state is maintained without starting the operation (S1302).

Here, the standby state means a state in which the operation of the defrosting heater is put on standby until the on-peak time period (or the highly billed rate time period) finishes, in case the expected operation time of the defrosting heater belongs to the on-peak time period (or the highly billed rate time period), with starting before the one-peak time period.

In this case, the substantial operation time of the defrosting heater may be extended as much as delayed time to perform complete defrosting In case the defrosting heater is put into operation based on the result of the determination, the remaining operation time of the defrosting heater is a predetermined value or less (S1303). In case the remaining operation time is the predetermined value or less currently, the current defrosting operation is maintained (S1304).

However, in case the remaining operation time of the defrosting heater is a predetermined value or more, the heat amount of the heater is decreased to reduce the power consumption (S1305).

With maintaining the above state, it is determined whether the operation of the defrosting heater is complete (S1306). Once the operation of the defrosting heater is completed, the standby state is maintained until the on-peak time period finishes (S1307).

Figure 14:
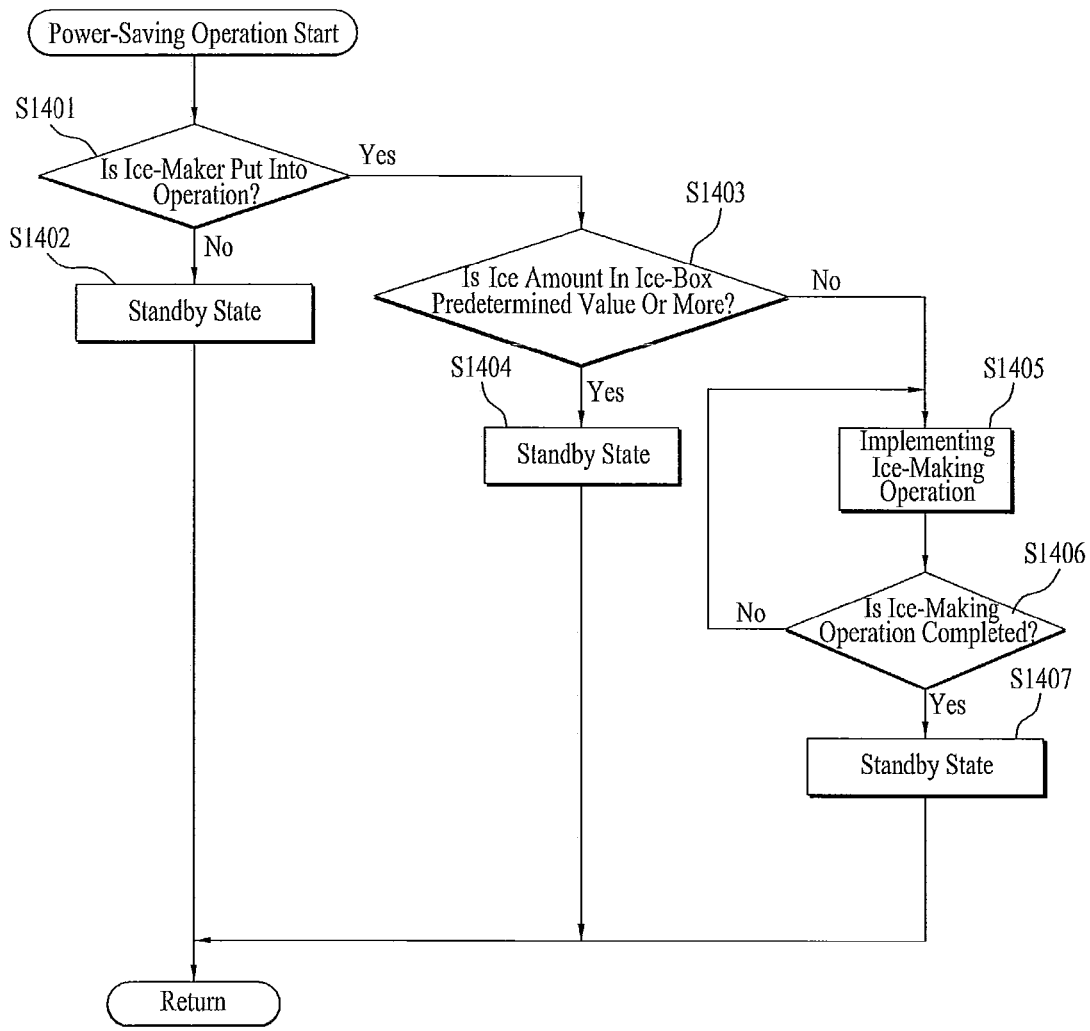

FIG. 14 is a control flow chart of a power-saving operation mode for the ice-maker provided in the refrigerator out of the electric appliances.

First of all, it is determined whether the ice-maker is put into operation (S1401). In case the ice-maker is not put into operation currently, that is, before the operation of the defrosting heater, a standby state is maintained without starting the operation (S1402).

Here, the standby state means a state in which the operation of the ice-maker is put on standby until the on-peak time period (or the highly billed rate time period) finishes, in case the expected operation time of the ice-maker belongs to the on-peak time period (or the highly billed rate time period), with starting before the on-peak time period (or the highly billed rate time period).

In case the ice-maker is put into operation based on the result of the determination, the amount of the ice cubes held in an ice box currently is a predetermined value or more (S1403).

In case the amount of the ice cubes is the predetermined value or more, it is not necessary to make more ice currently and the operation of the ice maker is stopped and the standby state is maintained. If then, operation of an ejecting heater or water supplying motor is stopped and power consumption is stopped accordingly (S1404).

In case the amount of the ice cubs held in the ice box is a predetermined value or less, it is necessary to make more ice and an ice-making operation is implemented (S1405).

Hence, it is determined whether the ice making operation is completed (S1406). If the ice making operation is completed based on the result of the determination, the standby state is maintained until the on-peak time period finishes (S1407).

Figure 15:
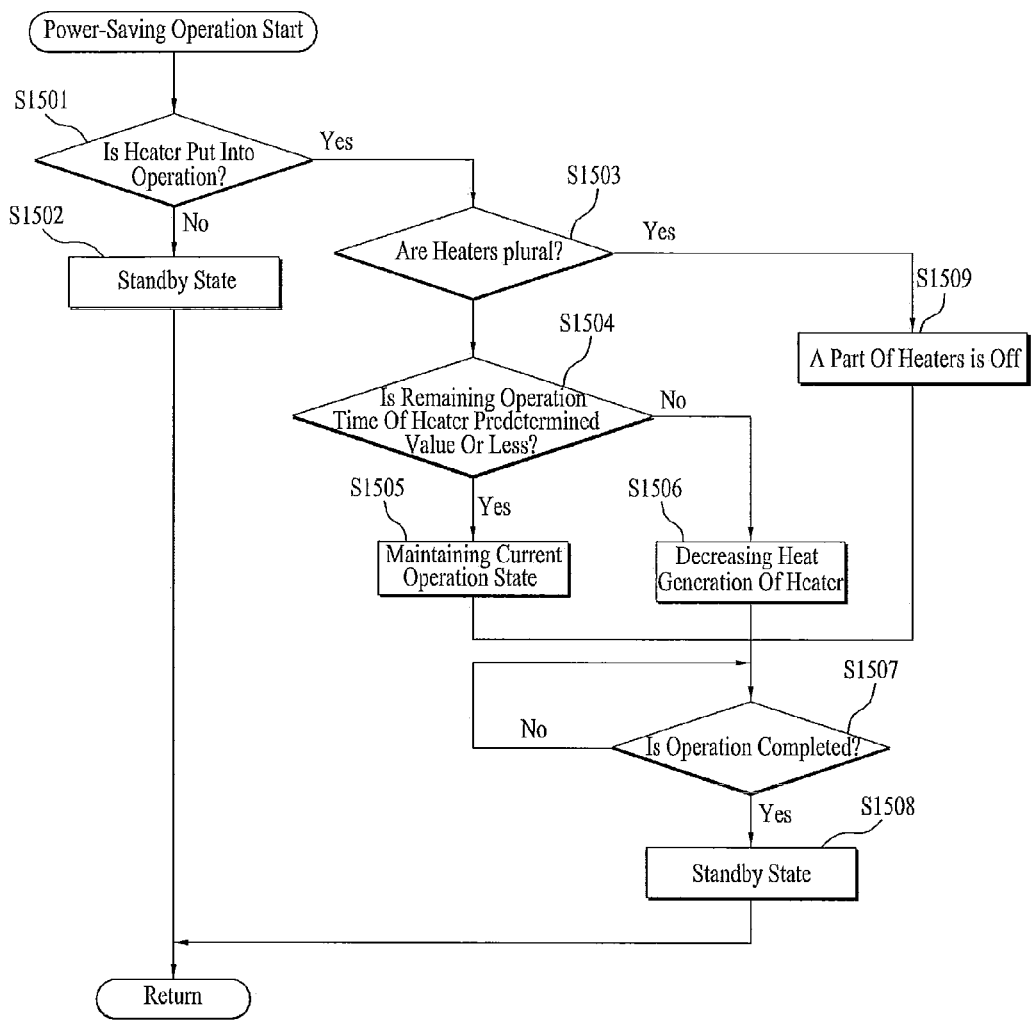
FIG. 15 is a control flow chart of a cooling appliance according to the present invention.

FIG. 15 is a diagram of a power-saving control method for the cooling appliance out of the electric appliances.

First of all, it is determined whether the heater is put into operation (S1501). In case the heater is not put into operation currently, that is, before the operation of the heater, a standby state is maintained without starting the operation (S1502).

Here, the standby state means a state in which the operation of the heater is put on standby until the on-peak time period (or the highly billed rate time period) finishes, in case the expected operation time of the heater belongs to the on-peak time period (or the highly billed rate time period), with starting before the one-peak time period.

In case the heater is put into operation based on the result of the determination, it is determined whether the plurality of the heaters are provided (S1503).

In case the plurality of the heaters are provided based on the result of the determination, a predetermined number of the heaters are controlled to be off (S1509).

However, in case a single heater is provided, it is determined whether the remaining operation time of the heater is a predetermined value or less (S1504).

The heater is controlled to be off or another operation mode ($1^{st}$ step or $2^{nd}$ step or $3^{rd}$ step) according to heating degree.

In case the remaining operation time is the predetermined value or less currently, the current operation state is maintained (S1505).

However, in case the remaining operation time is a predetermined value or more, the amount of the heat generated by the heater is decreased to reduce power consumption (S1506).

Hence, it is determined whether the operation of the heater is completed with maintaining the above state (S1507). In case the operation of the heater is completed based on the result of the determination, the standby state is maintained until the one-peak time period finishes (S1508).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electric appliance comprising:
   a communication device connected with a smart grid net and configured to receive electric power information including a billed power-rate for each time period and a highly billed power rate time period in which the billed power-rate is a predetermined reference rate or more;
   a sensing device configured to sense an operation mode and an operation state according to the operation mode; and
   a control device configured to implement power-saving operation based on the received electric power information and the operation state sensed by the sensing device,
   wherein, when the highly billed power rate time period does not start during operation of a power consuming part required to implement the operation mode, the control device is configured to complete the operation, and
   wherein, when the highly billed power rate time period starts during the operation of the power consuming part required to implement the operation mode, the control device is further configured to:
      put on standby the operation of the power consuming part until the highly billed power rate time period finishes, if a remaining operation time or a remaining number of cycles of the power consuming part is equal to or larger than a predetermined time or a predetermined number, and
      complete the operation during the remaining operation time and the remaining number of cycles, if the remaining operation time or the remaining number of cycles of the power consuming part is smaller than the predetermined time or the predetermined number.

2. The electric appliance of claim 1, wherein the electric power information further comprises:
   changeable unit prices according to a variation of time, or amount of usage of electric power.

3. The electric appliance of claim 2, wherein the control device controls an operational start of the power consuming part to be put on standby until the highly billed power rate time period finishes, when an expected operation time of the power consuming part required to implement the operation mode overlaps with the highly billed power rate time period.

4. A control method of an electric appliance, the method comprising:
   receiving electric power information and an operation mode set for an electric appliance, the electric power information including a billed power rate for each time period, a highly billed power rate time period in which the billed power-rate is a predetermined reference rate or more and a non-highly billed power rate time period in which the billed power-rate is a predetermined reference rate or less;
   determining whether a current time is in a highly billed rate time period or non-highly billed rate time period; and
   controlling an operation of a power consuming part to implement a power-saving mode or the operation mode in consideration of an operation time to implement the operation mode and the highly billed power rate time period,
   wherein, when the highly billed power rate time period does not start during operation of a power consuming part required to implement the operation mode, the method further comprises completing the operation, and
   wherein, when the highly billed power rate time period starts during the operation of the power consuming part required to implement the operation mode, the method further comprises the steps of:
      putting on standby the operation of the power consuming part until the highly billed power rate time period finishes, if a remaining operation time or a remaining number of cycles of the power consuming part is equal to or larger than a predetermined time or a predetermined number, and
      completing the operation during the remaining operation time and the remaining number of cycles, if the remaining operation time or the remaining number of cycles of the power consuming part is smaller than the predetermined time or the predetermined number.

5. The control method of claim 4, wherein the operation mode is implemented in case an operation time of the operation mode is in the non-highly power billed rate time period; and
   the power-saving mode consuming lower electric power than the operation mode is implemented, in case the operation time of the operation mode is in the highly billed power rate time period.

6. The control method of claim 4, wherein operation start of a predetermined power consuming part is controlled to be put on standby until the highly billed power rate time period finishes, when an operation time of the power consuming part required to implement the operation mode overlaps with the highly billed power rate time period.

7. The control method of claim 4, wherein the electric appliance is a washing machine and start of a washing cycle or rinsing cycle is controlled to be put on standby until the highly billed power rate time period finishes, when the operation time of a washing cycle or rinsing cycle out of the operation mode is in the highly billed power rate time period, as an expected start timing of the washing cycle or the rinsing cycle comes before the highly billed power rate time period start.

8. The control method of claim 6, wherein the electric appliance is an air conditioner; and
   operation start of a compressor is controlled to put on standby until the highly billed rate time period finishes, in case an expected operation time of the compressor is in the highly billed rate time period as the expected start timing comes before the highly billed rate time period.

9. The control method of claim 6, wherein the electric appliance is a refrigerator; and
operation start of a defrosting heater or ice-maker is controlled to be put on standby until the highly billed rate time period finishes, in case an expected operation time of the defrosting heater or ice-maker is in the highly billed rate time period as an expected start timing of the defrosting heater or ice-maker comes before the highly billed rate time period.

10. The control method of claim 6, wherein the electric appliance is a cooking appliance; and
operation start of a heater is controlled to be put on standby until the highly billed rate time period finishes, in case an expected operation time of the heater is in the highly billed rate time period as a start timing of the heater comes before the highly billed rate time period.

11. The control method of claim 4, wherein the electric appliance is a washing machine; and
heating is stopped and the heating is put on standby until the highly billed power rate time period finishes, when the highly billed power rate time period starts during the heating-washing cycle, or a target temperature of heated water is controlled to be lowered.

12. The control method of claim 4, wherein the electric appliance is a washing machine; and
a rinsing cycle is implemented and that state is controlled to be put on standby until the highly billed power rate time period finishes, when the highly billed power rate time period starts during the rinsing cycle.

13. The control method of claim 4, wherein the electric appliance is a washing machine; and
only a spinning cycle is implemented without implementing a drying cycle, in case the highly billed power rate time period starts during a main-spinning cycle including a drying cycle and after that, state is controlled to be put on standby until the highly billed power rate time period finishes.

14. The control method of claim 4, wherein the electric appliance is a washing machine; and
a spinning cycle is implemented and power of the washing machine is controlled to be shut off, when the highly billed power rate time starts during a main-spinning cycle not including a drying cycle.

15. The control method of claim 4, wherein the electric appliance is a washing machine; and
operation of a heater is stopped and the motor is driven at the lowest speed and the lowest net acting ratio, when the highly billed power rate time period starts during a drying cycle.

16. The control method of claim 4, wherein the electric appliance is an air conditioner; and in case the highly billed rate time period starts during operation of a compressor, further comprising:
determining whether the remaining operation time of a compressor is a predetermined value or less; and
maintaining a current operation state in case the remaining operation time is a predetermined value or less based on the result of the determination and implementing power-consumption-decreasing operation of the compressor in case the remaining operation time is a predetermined value or more based on the result of the determination.

17. The control method of claim 4, wherein the electric appliance is a refrigerator; and in case the highly billed rate time period starts during operation of a defrosting heater, further comprising:
determining whether the remaining operation time of the defrosting heater is a predetermined value or less; and
maintaining a current operation state, in case the remaining operation time is the predetermined value or less based on the result of the determination, and implementing power consumption decreasing operation of the defrosting heater in case the remaining operation time is a predetermined value or more based on the result of the determination.

18. The control method of claim 4, wherein the electric appliance is a cooking appliance; and in case the highly billed rate time period starts during operation of a heater, further comprising:
determining the number of heaters and stopping a predetermined number of the heaters in case a plurality of heaters are provided;
determining whether the remaining operation time of the heater is a predetermined value or less and maintaining a current state in case a single heater is provided; and
decreasing the amount of heat generated by the heater, in case the remaining operation time of the heater is a predetermined value or more.

* * * * *